US012688190B2

(12) United States Patent
Yedte et al.

(10) Patent No.: US 12,688,190 B2
(45) Date of Patent: Jul. 21, 2026

(54) SYSTEMS AND METHODS FOR GENERATING OPTIMIZED QUERIES FOR DISPARATE DATA SOURCES

(71) Applicant: BANK OF AMERICA CORPORATION, Charlotte, NC (US)

(72) Inventors: Ashwin Kumar Yedte, Telangana (IN); Diane S. Cannato, Palm City, FL (US); Soumya Bandyopadhyay, Fairless, PA (US); Sunil Bhashetty, Hyderabad (IN); Sridhar Viswanathan, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 15 days.

(21) Appl. No.: 18/811,367

(22) Filed: Aug. 21, 2024

(65) Prior Publication Data

US 2026/0056946 A1 Feb. 26, 2026

(51) Int. Cl.
*G06F 16/2453* (2019.01)

(52) U.S. Cl.
CPC ................................. *G06F 16/2453* (2019.01)

(58) Field of Classification Search
None
See application file for complete search history.

(56) References Cited

U.S. PATENT DOCUMENTS

| | | | |
|---|---|---|---|
| 9,961,200 B1 * | 5/2018 | Kothuvatiparambil | ..................... G10L 15/1822 |
| 2014/0089311 A1 * | 3/2014 | Richards | ........... G06F 16/24549 707/E17.046 |
| 2019/0102411 A1 * | 4/2019 | Hung | ...................... G06F 16/21 |
| 2020/0327127 A1 * | 10/2020 | Nanal | ................. G06F 16/2453 |
| 2024/0232664 A1 * | 7/2024 | De | ........................... G06F 40/30 |

FOREIGN PATENT DOCUMENTS

| CN | 108804532 B | 6/2020 |
|---|---|---|
| CN | 105447129 B | 9/2020 |

* cited by examiner

*Primary Examiner* — Scott A. Waldron
(74) *Attorney, Agent, or Firm* — Moore & Van Allen PLLC; Lauren M. Stokes

(57) ABSTRACT

Systems, computer program products, and methods are described herein for generating optimized queries for disparate data sources. The present invention is configured to identify a query; determine, based on a parsing of the query, at least one attribute and at least one intent of the query; generate a map comprising the query, the intent, and the attribute; apply the map to a cluster of maps, wherein the cluster of maps comprises the intent associated with a secondary attribute different from the attribute, and a secondary query; generate, based on the cluster of maps, a heat map of the cluster of maps, wherein the heat map comprises an indication of a computer processing consumption of a query with the intent and the attribute, and the secondary intent with the secondary attribute and the secondary query; and determine, based on the heat map, an optimized query for the intent.

20 Claims, 12 Drawing Sheets

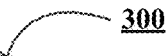

300

IDENTIFY AT LEAST ONE QUERY
302

DETERMINE, BASED ON A PARSING OF THE AT LEAST ONE QUERY, AT LEAST ONE
ATTRIBUTE AND AT LEAST ONE INTENT OF THE AT LEAST ONE QUERY
304

GENERATE A MAP COMPRISING THE AT LEAST ONE QUERY, THE AT LEAST ONE
INTENT, AND THE AT LEAST ONE ATTRIBUTE
306

APPLY THE MAP TO A CLUSTER OF MAPS, WHEREIN THE CLUSTER OF MAPS
COMPRISES THE AT LEAST ONE INTENT ASSOCIATED WITH AT LEAST ONE
SECONDARY ATTRIBUTE DIFFERENT FROM THE AT LEAST ONE ATTRIBUTE, AND
THE AT LEAST ONE SECONDARY QUERY
308

GENERATE, BASED ON THE CLUSTER OF MAPS, A HEAT MAP OF THE CLUSTER OF
MAPS, WHEREIN THE HEAT MAP COMPRISES AN INDICATION OF A COMPUTER
PROCESSING CONSUMPTION OF AT LEAST ONE QUERY WITH THE AT LEAST ONE
INTENT AND THE AT LEAST ONE ATTRIBUTE, AND THE AT LEAST ONE
SECONDARY INTENT WITH THE AT LEAST ONE SECONDARY ATTRIBUTE AND THE
AT LEAST ONE SECONDARY QUERY
310

DETERMINE, BASED ON THE HEAT MAP, AN OPTIMIZED QUERY FOR THE AT LEAST
ONE INTENT
312

UPDATE, BY AN ARTIFICIAL INTELLIGENCE (AI) ENGINE, THE HEAT MAP, WHEREIN
THE AI ENGINE MONITORS THE COMPUTER PROCESSING CONSUMPTION OF EACH
QUERY IN THE HEAT MAP
402

FIGURE 4

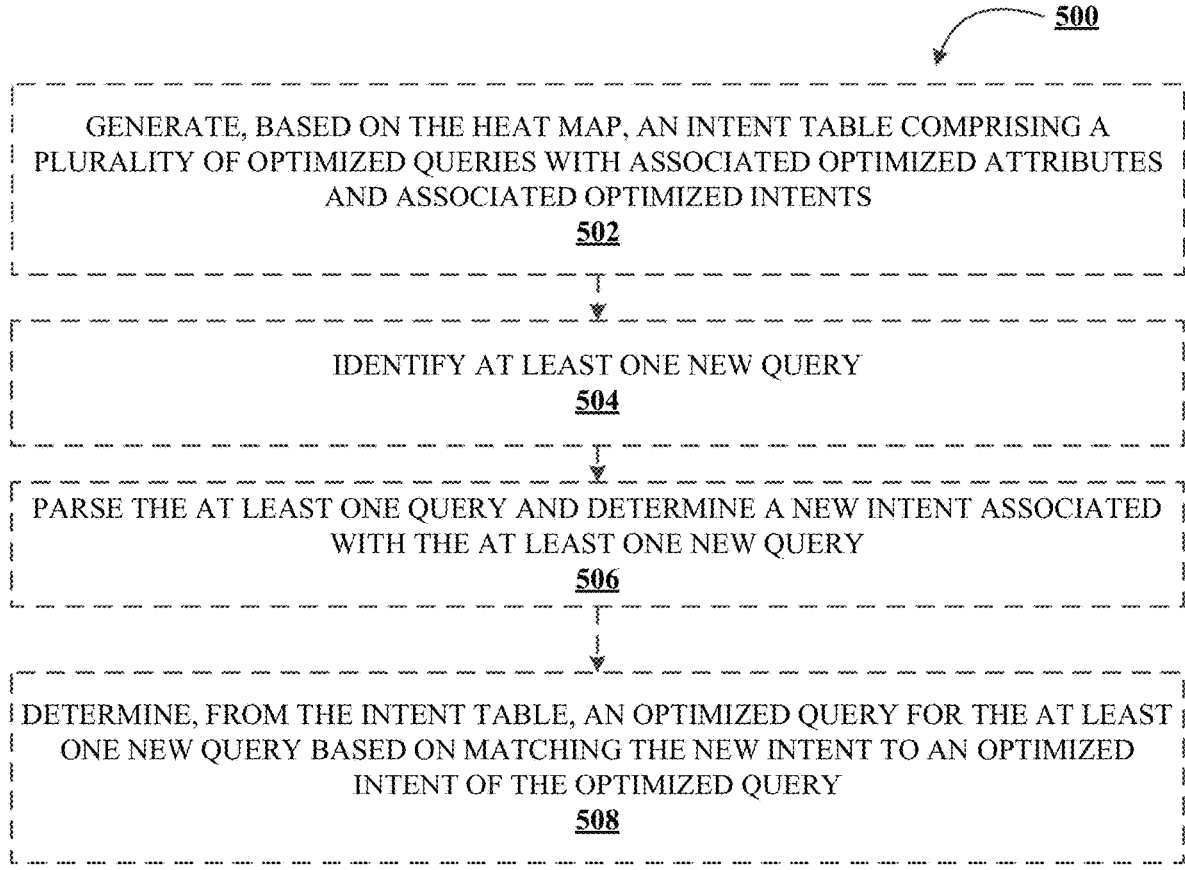

GENERATE, BASED ON THE HEAT MAP, AN INTENT TABLE COMPRISING A
PLURALITY OF OPTIMIZED QUERIES WITH ASSOCIATED OPTIMIZED ATTRIBUTES
AND ASSOCIATED OPTIMIZED INTENTS
502

IDENTIFY AT LEAST ONE NEW QUERY
504

PARSE THE AT LEAST ONE QUERY AND DETERMINE A NEW INTENT ASSOCIATED
WITH THE AT LEAST ONE NEW QUERY
506

DETERMINE, FROM THE INTENT TABLE, AN OPTIMIZED QUERY FOR THE AT LEAST
ONE NEW QUERY BASED ON MATCHING THE NEW INTENT TO AN OPTIMIZED
INTENT OF THE OPTIMIZED QUERY
508

GENERATE THE HEAT MAP COMPRISING THE CLUSTER OF MAPS, WHEREIN THE HEAT MAP FURTHER COMPRISES THE AT LEAST ONE DIFFERENT QUERY WITH THE AT LEAST ONE DIFFERENT INTENT AND THE AT LEAST ONE DIFFERENT ATTRIBUTE
602

700

DETERMINE, BASED ON THE APPLICATION OF THE MAP TO THE CLUSTER OF
MAPS, A FREQUENCY OF THE AT LEAST ONE INTENT IN THE CLUSTER OF MAPS,
WHEREIN THE FREQUENCY OF THE AT LEAST ONE INTENT IS BASED ON A
PRESENCE OF THE AT LEAST ONE INTENT IN THE CLUSTER OF MAPS
702

DETERMINE, BASED ON THE APPLICATION OF THE MAP TO THE CLUSTER OF MAPS, A HIGHEST FREQUENCY OF INTENTS IN THE CLUSTER OF MAPS, WHEREIN THE HIGHEST FREQUENCY OF INTENTS IS BASED ON A HIGHEST PRESENCE BETWEEN THE AT LEAST ONE INTENT AND THE AT LEAST ONE SECONDARY INTENT
802

GENERATE, BASED ON THE HIGHEST FREQUENCY OF INTENTS, A CACHE OF THE HIGHEST FREQUENCY OF INTENTS, WHEREIN THE CACHE COMPRISES AT LEAST ONE INTENT AND THE AT LEAST ONE ATTRIBUTE OR THE AT LEAST ONE SECONDARY INTENT AND THE AT LEAST ONE SECONDARY ATTRIBUTE
804

FIGURE 8

SYSTEMS AND METHODS FOR GENERATING OPTIMIZED QUERIES FOR DISPARATE DATA SOURCES

FIELD OF THE INVENTION

The present invention embraces a system for generating optimized queries for disparate data sources.

BACKGROUND

In data lake environments and vast databases, thousands of tables of data can be stored from thousands system of records (SORs) and data is constantly derived on a daily basis from one part of a data lake to another part. Such a derivation may join disparate tables to derive attributes useful for data searching, collecting, reporting, and/or passing to a system outside of the data lake via raw data. Further issues arise and further computing resources may be used when deriving the data in developing and maintaining as many of the attributes and tables derived by source applications of the data cannot be re-used by other applications sitting on top of and interacting with the data lakes. Thus, there exists a great need for a system that can efficiently, dynamically, and accurately generate optimized queries for disparate data sources based on query, intent, and attribute mining, mapping the attributes and intents, and determining computer processing consumption of the queries.

Applicant has identified a number of deficiencies and problems associated with generating queries for disparate data. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for generating optimized queries for disparate data sources is provided. In some embodiments, the system may comprise: a memory device with computer-readable program code stored thereon; at least one processing device operatively coupled to the at least one memory device and the at least one communication device, wherein executing the computer-readable code is configured to cause the at least one processing device to: identify at least one query; determine, based on a parsing of the at least one query, at least one attribute and at least one intent of the at least one query; generate a map comprising the at least one query, the at least one intent, and the at least one attribute; apply the map to a cluster of maps, wherein the cluster of maps comprises the at least one intent associated with at least one secondary attribute different from the at least one attribute, and at least one secondary query; generate, based on the cluster of maps, a heat map of the cluster of maps, wherein the heat map comprises an indication of a computer processing consumption of at least one query with the at least one intent and the at least one attribute, and the at least one secondary intent with the at least one secondary attribute and the at least one secondary query; and determine, based on the heat map, an optimized query for the at least one intent.

In some embodiments, executing the computer-readable code is further configured to cause the at least one processing device to: update, by an artificial intelligence (AI) engine, the heat map, wherein the AI engine monitors the computer processing consumption of each query in the heat map.

In some embodiments, executing the computer-readable code is further configured to cause the at least one processing device to: generate, based on the heat map, an intent table comprising a plurality of optimized queries with associated optimized attributes and associated optimized intents; identify at least one new query; parse the at least one new query and determine a new intent associated with the at least one new query; and determine, from the intent table, an optimized query for the at least one new query based on matching the new intent to an optimized intent of the optimized query. In some embodiments, the optimized query comprises a lesser computer processing consumption rate than the new query.

In some embodiments, the determination of the optimized query is based on an optimized computer processing consumption in the heat map, wherein the optimized computer processing component is based on a lowest computer processing component rate.

In some embodiments, the cluster of maps further comprises at least one different query, at least one different intent, and at least one different attribute, and wherein executing the computer-readable code is further configured to cause the at least one processing device to: generate the heat map comprising the cluster of maps, wherein the heat map further comprises the at least one different query with the at least one different intent and the at least one different attribute.

In some embodiments, the computer processing consumption comprises a memory resource consumption, a power resource consumption, or a processing component consumption.

In some embodiments, the at least one intent comprises the at least one attribute for the at least one query.

In some embodiments, executing the computer-readable code is further configured to cause the at least one processing device to: determine, based on the application of the map to the cluster of maps, a frequency of the at least one intent in the cluster of maps, wherein the frequency of the at least one intent is based on a presence of the at least one intent in the cluster of maps.

In some embodiments, executing the computer-readable code is further configured to cause the at least one processing device to: determine, based on the application of the map to the cluster of maps, a highest frequency of intents in the cluster of maps, wherein the highest frequency of intents is based on a highest presence between the at least one intent and the at least one secondary intent; and generate, based on the highest frequency of intents, a cache of the highest frequency of intents, wherein the cache comprises at least one intent and the at least one attribute or the at least one secondary intent and the at least one secondary attribute.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
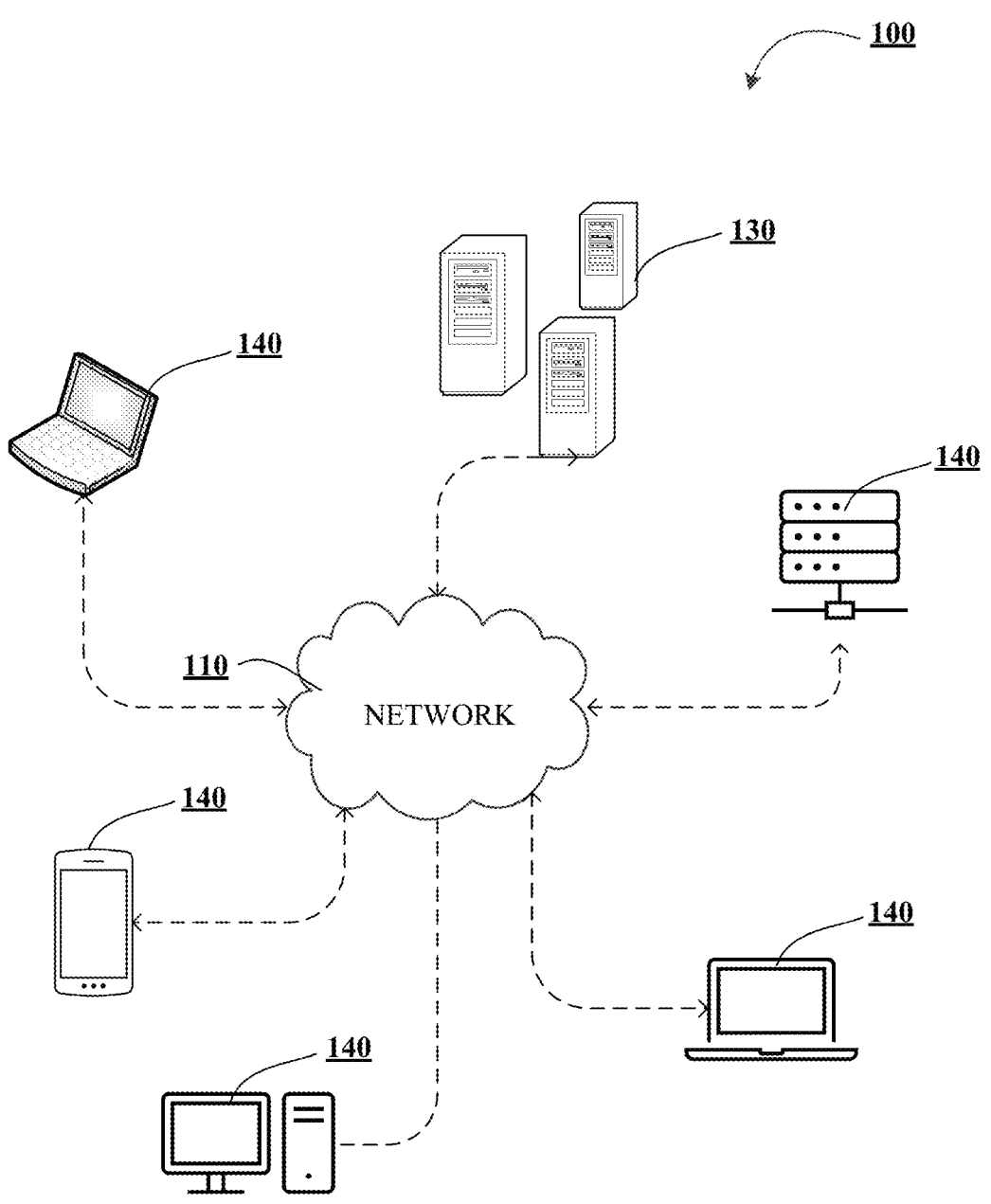
Figure 1B:
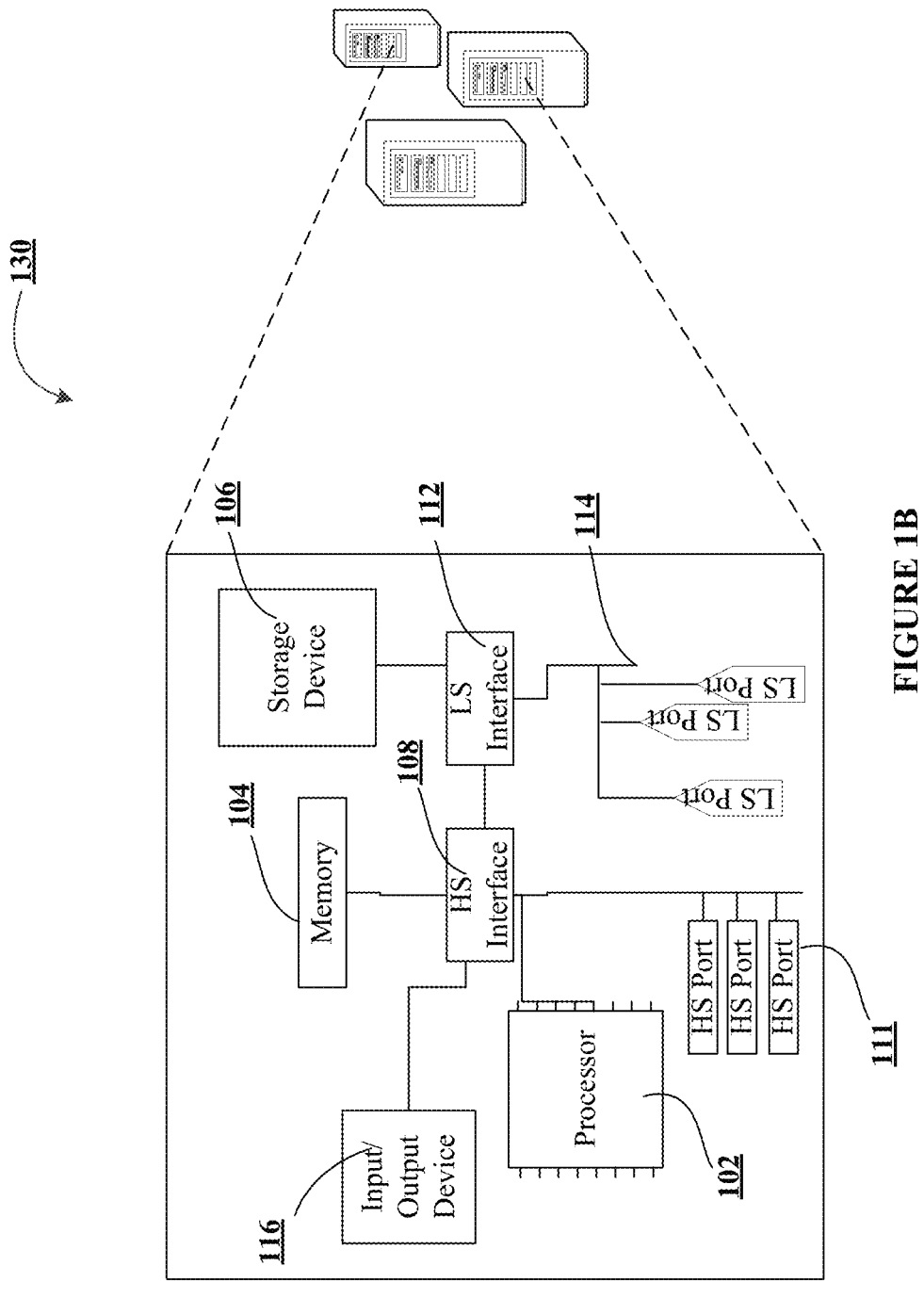
Figure 1C:
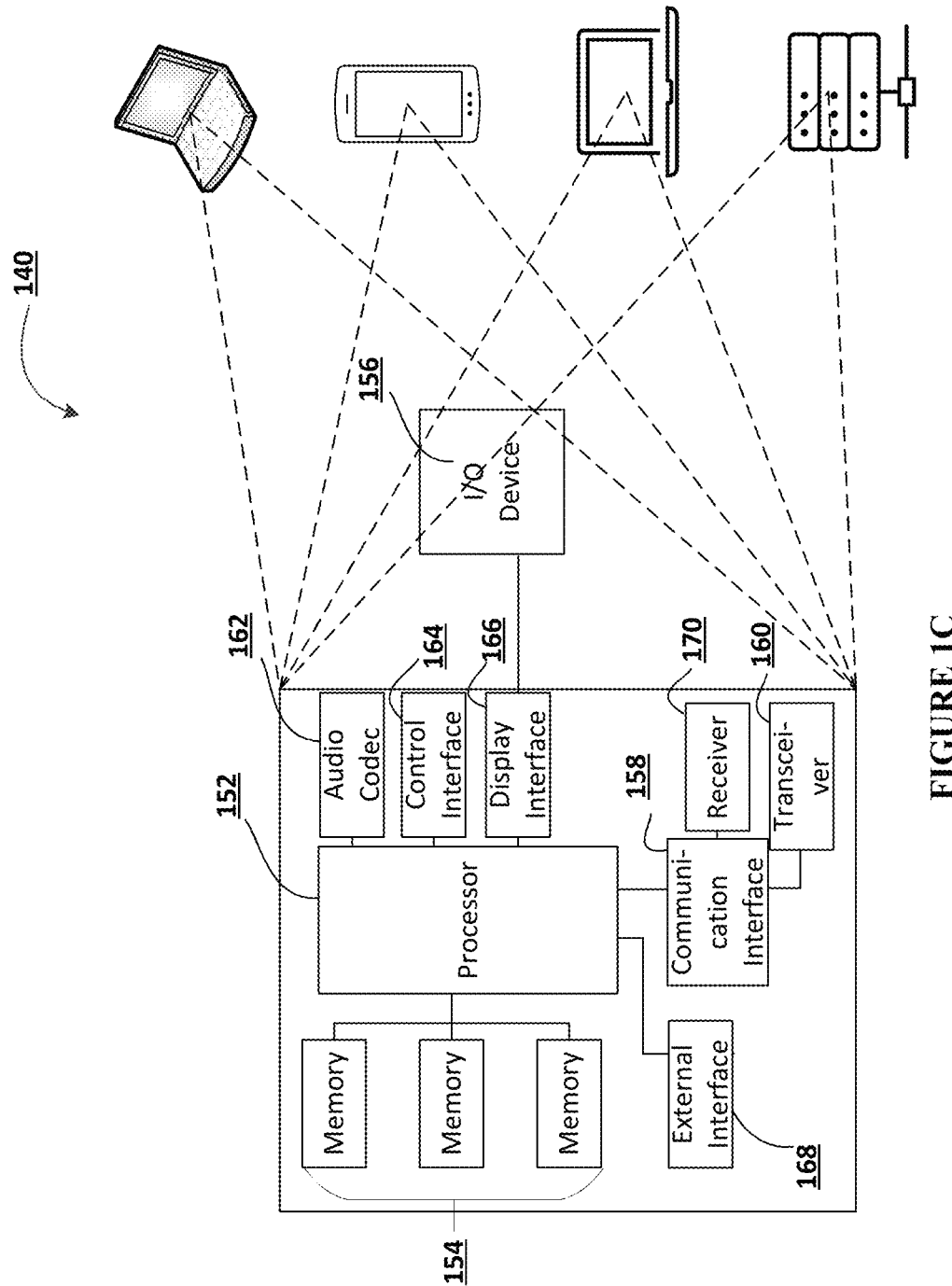
Figure 2:
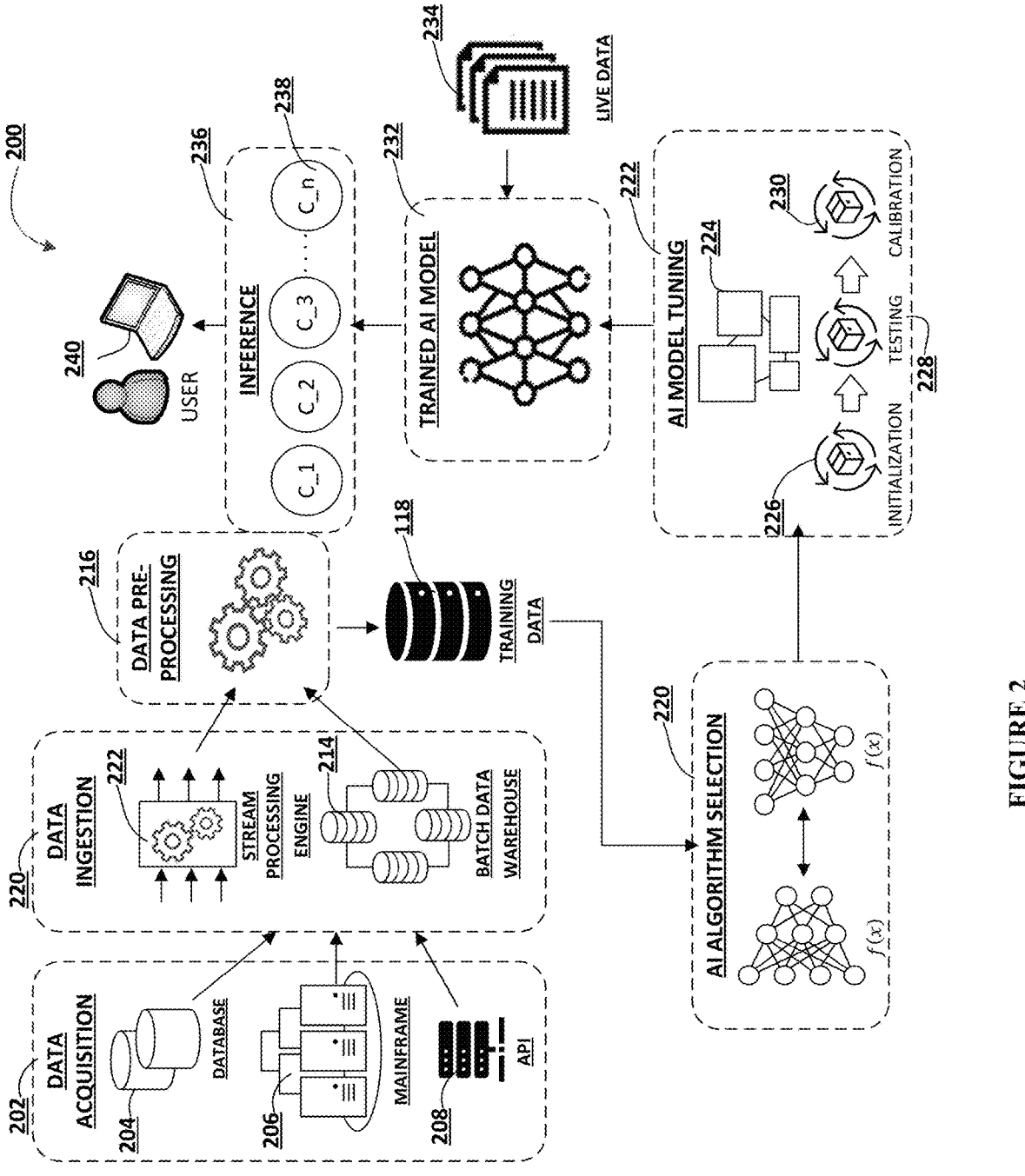
Figure 6:
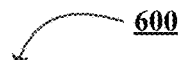
Figure 7:
Figure 9:
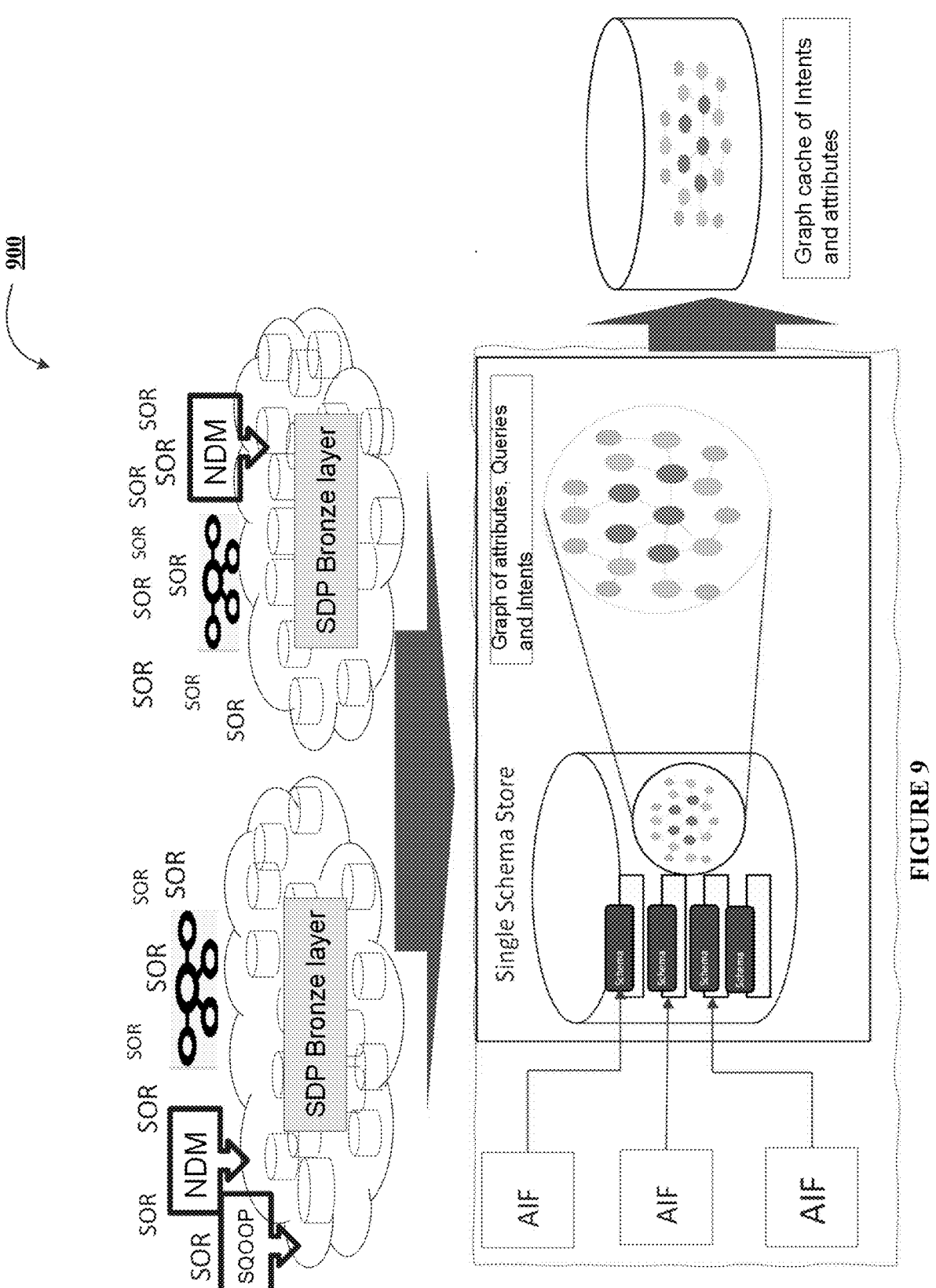
Figure 10:
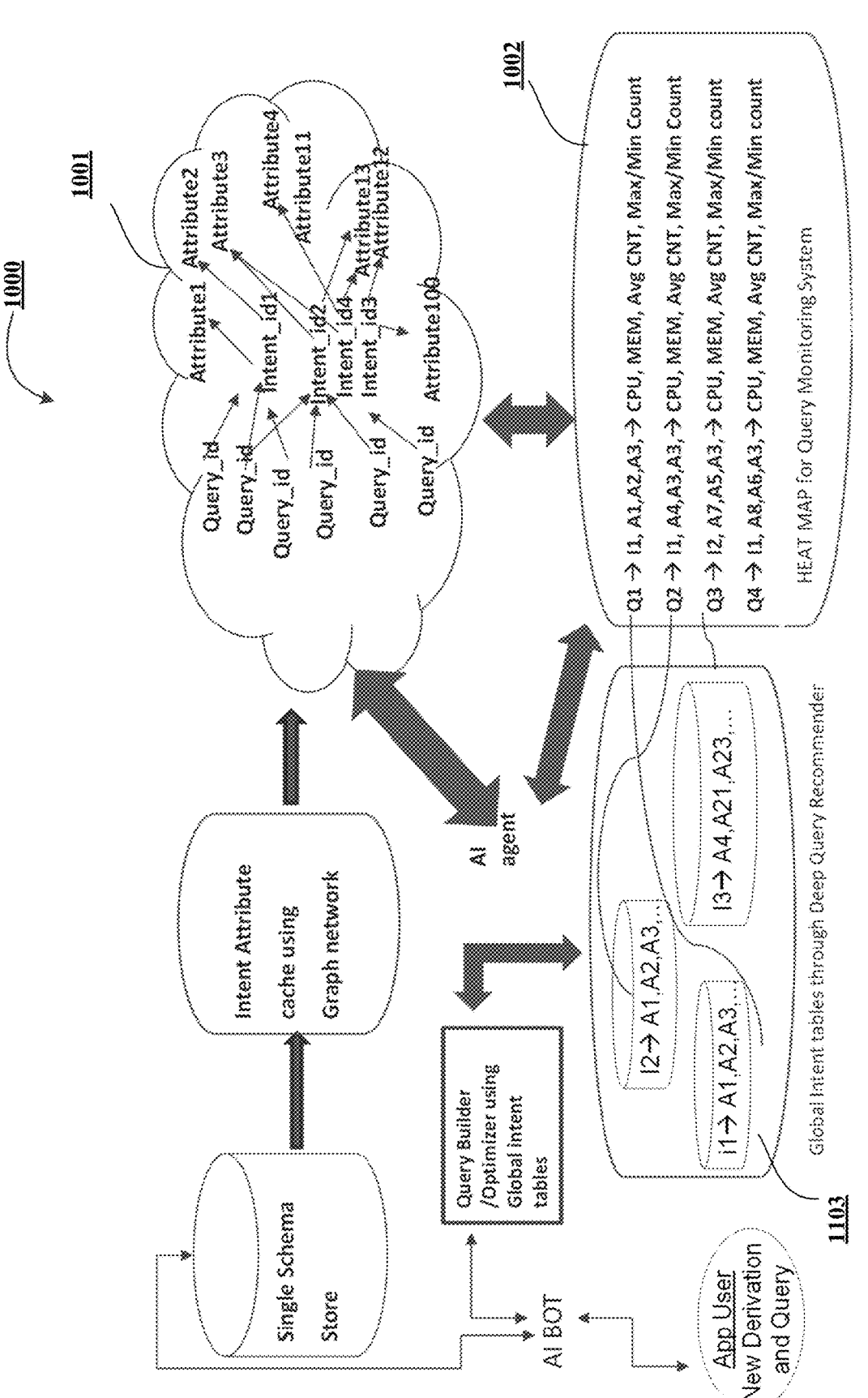

Having thus described embodiments of the invention in general terms, reference will now be made the accompanying drawings, wherein:

FIGS. 1A-1C illustrates technical components of an exemplary distributed computing environment for generating optimized queries for disparate data sources, in accordance with an embodiment of the disclosure;

FIG. 2 illustrates an exemplary artificial intelligence (AI) engine subsystem architecture, in accordance with an embodiment of the disclosure;

FIG. 3 illustrates a process flow for generating optimized queries for disparate data sources, in accordance with an embodiment of the disclosure;

FIG. 4 illustrates a process flow for updating the heat map using an AI engine, in accordance with an embodiment of the disclosure;

FIG. 5 illustrates a process flow for determining an optimized query from an intent table, in accordance with an embodiment of the disclosure;

FIG. 6 illustrates a process flow for generating the heat map with the cluster of maps, in accordance with an embodiment of the disclosure;

FIG. 7 illustrates a process flow for determining a frequency of the at least one intent in the cluster of maps, in accordance with an embodiment of the disclosure;

FIG. 8 illustrates a process flow for generating a cache of highest frequency of intents, in accordance with an embodiment of the disclosure;

FIG. 9 illustrates an exemplary technical flow diagram for generating a cluster of maps and caching intents, in accordance with an embodiment of the disclosure; and FIG. 10 illustrates an exemplary technical flow diagram for generating optimized queries for disparate data sources, in accordance with an embodiment of the disclosure.

DETAILED DESCRIPTION OF EMBODIMENTS
OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

In data lake environments and vast databases, thousands of tables of data can be stored from thousands system of records (SORs) and data is constantly derived on a daily basis from one part of a data lake to another part. Such a derivation may join disparate tables to derive attributes useful for data searching, collecting, reporting, and/or passing to a system outside of the data lake via raw data. Further issues arise and further computing resources may be used when deriving the data in developing and maintaining as many of the attributes and tables derived by source applications of the data cannot be re-used by other applications sitting on top of and interacting with the data lakes. Thus, there exists a great need for a system that can efficiently, dynamically, and accurately generate optimized queries for disparate data sources based on query, intent, and attribute mining, mapping the attributes and intents, and determining computer processing consumption of the queries.

Accordingly, the present disclosure provides for the identification of at least one query; the determination, based on a parsing of the at least one query, of at least one attribute and at least one intent of the at least one query; the generation of a map comprising the at least one query, the at least one intent, and the at least one attribute; and the application of the map to a cluster of maps, wherein the cluster of maps comprises the at least one intent associated with at least one secondary attribute different from the at least one attribute, and at least one secondary query. Further, the disclosure provides for the generation, based on the cluster of maps, of a heat map of the cluster of maps, wherein the heat map comprises an indication of a computer processing consumption of at least one query with the at least one intent and the at least one attribute, and the at least one secondary intent with the at least one secondary attribute and the at least one secondary query; and the determination, based on the heat map, of an optimized query for the at least one intent.

In other words, the disclosure provides a system for generating optimized queries for disparate data tables and disparate data within a data lake(s). The system does this by first storing all the historical queries, their derivations (e.g., outputs), and attributes. Once the historical queries and their associated data has been stored, the system may identify the intents of each query and whether any intents of these historical queries overlap (e.g., overlapping derivations). The system may additionally generate graphs showing the linking and overlapping between the queries, intents, and attributes. Further, and upon identifying the commonly used attributes queries, attributes, and intents, whereby the graph may then be used to identify the commonalities between the queries, the attributes, and their intents. Upon identifying the commonalities, the system may generate a heat map showing the resources used for each query across each intent. An AI engine may take the commonalities mapped and the heat map of resources used to generate an optimized query for each intent. In some embodiments, the system may further generate a global table(s) comprising the optimized queries to perform the shortest execution path for each intent.

What is more, the present invention provides a technical solution to a technical problem. As described herein, the technical problem includes the generation of queries for disparate data. The technical solution presented herein allows for optimized queries for disparate data based on parsing and identifying attributes and intents for each query; mapping the queries, attributes, and intents; and determining the optimized query for each intent. In particular, the present disclosure is an improvement over existing solutions for querying disparate data, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for generating optimized queries for disparate data sources 100, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary artificial intelligence (AI) engine subsystem architecture 200, in accordance with an embodiment of the disclosure. The artificial intelligence subsystem 200 may include a data acquisition engine 202, data ingestion engine 210, data pre-processing engine 216, AI engine tuning engine 222, and inference engine 236.

The data acquisition engine 202 may identify various internal and/or external data sources to generate, test, and/or integrate new features for training the artificial intelligence engine 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In artificial intelligence, the quality of data and the useful information that can be derived therefrom directly affects the ability of the artificial intelligence engine 224 to learn. The data pre-processing engine 216 may implement advanced integration and processing steps needed to prepare the data for artificial intelligence execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of artificial intelligence algorithm being used, this training data 218 may require further enrichment. For example, in supervised learning, the training data is enriched using one or more meaningful and informative labels to provide context so a artificial intelligence engine can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The AI tuning engine 222 may be used to train an artificial intelligence engine 224 using the training data 218 to make predictions or decisions without explicitly being programmed to do so. The artificial intelligence engine 224 represents what was learned by the selected artificial intelligence algorithm 220 and represents the rules, numbers, and any other algorithm-specific data structures required for classification. Selecting the right artificial intelligence algorithm may depend on a number of different factors, such as the problem statement and the kind of output needed, type and size of the data, the available computational time, number of features and observations in the data, and/or the like. Artificial intelligence algorithms may refer to programs (math and logic) that are configured to self-adjust and perform better as they are exposed to more data. To this extent, artificial intelligence algorithms are capable of adjusting their own parameters, given feedback on previous performance in making prediction about a dataset.

The artificial intelligence algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable artificial intelligence engine type. Each of these types of artificial intelligence algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the artificial intelligence engine, the AI tuning engine 222 may repeatedly execute cycles of experimentation 226, testing 228, and tuning 230 to optimize the performance of the artificial intelligence algorithm 220 and refine the results in preparation for deployment of those results for consumption or decision making. To this end, the AI tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the engine is the measurement used to determine which set of hyperparameters is best at identifying relationships and patterns between variables in a dataset based on the input, or training data 218. A fully trained artificial intelligence engine 232 is one whose hyperparameters are tuned and engine accuracy maximized.

The trained artificial intelligence engine 232, similar to any other software application output, can be persisted to storage, file, memory, or application, or looped back into the processing component to be reprocessed. More often, the trained artificial intelligence engine 232 is deployed into an existing production environment to make practical business decisions based on live data 234. To this end, the artificial intelligence subsystem 200 uses the inference engine 236 to make such decisions. The type of decision-making may depend upon the type of artificial intelligence algorithm used. For example, artificial intelligence engines trained using supervised learning algorithms may be used to structure computations in terms of categorized outputs (e.g., $C\_1$, $C\_2$ . . . $C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, artificial intelligence engines trained using unsupervised learning algorithms may be used to group (e.g., $C\_1$, $C\_2$ . . . $C\_n$ 238) live data 234 based on how similar they are to one another to solve exploratory challenges where little is known about the data, provide a description or label (e.g., $C\_1$, $C\_2$ . . . $C\_n$ 238) to live data 234, such as in classification, and/or the like. These categorized outputs, groups (clusters), or labels are then presented to the user input system 130. In still other cases, artificial intelligence engines that perform regression techniques may use live data 234 to predict or forecast continuous outcomes.

It will be understood that the embodiment of the artificial intelligence subsystem 200 illustrated in FIG. 2 is exemplary and that other embodiments may vary. As another example, in some embodiments, the artificial intelligence subsystem 200 may include more, fewer, or different components.

FIG. 3 illustrates a process flow 300 for generating optimized queries for disparate data sources, in accordance with an embodiment of the disclosure. In some embodiments, a system (e.g., similar to one or more of the systems described herein with respect to FIGS. 1A-1C) may perform one or more of the steps of process flow 300. For example, a system (e.g., the system 130 described herein with respect to FIG. 1A-1C) may perform the steps of process 300. In some embodiments, an artificial intelligence engine (e.g., such as the AI engine shown in FIG. 2) may perform some or all of the steps described in process flow 300.

As shown in block 302, the process flow 300 may include the step of identifying at least one query. For instance, the system may identify at least one query submitted from a user device to query a database, a data lake, an application, and/or the like, whereby the query may comprise computer-readable instructions for searching within the database, data lake, application, and/or the like, for specified data. Thus, and in some embodiments, the system may identify at least one query by identifying the receipt of the query at a data lake, at an application that sits on top of the data lake and is capable of searching within the data lake, at a database, at a server, and/or the like. In some embodiments, the system, or another system operatively coupled to system described herein, may generate a query queue of all the queries identified based on the sequence of each query's identification by the system, and store the query queue for processing in the same sequence. In some embodiments, the query queue may be processed by the system described herein and by using the processes described herein.

By way of non-limiting example, and in some embodiments, data may be stored within a data lake (or multiple data lakes) associated with a network, where multiple systems of record data and multiple sources (multiple applications, databases, and/or the like) may feed the data stored in the data lake(s). Further, and based on the large amount of data within each data lake and the potential for multiple data lakes, millions of queries may be submitted by a user in a short amount of time. Even more at issue, many users may each submit these millions of queries to the same data lakes, and it may be difficult for a network, processing components, or servers to keep up with level of queries received and also run each query when each query differs so much (e.g., as each user inputs their own format for their queries, or as each application and piece of data requires their own query formats). Thus, there exists a great need for a system that can analyze these identified queries and generate optimized queries for all these disparate data sources.

As shown in block 304, the process flow 300 may include the step of determining, based on the parsing of the at least one query, at least one attribute and at least one intent of the at least one query. For instance, the system may—after identifying the at least one query—parse the at least one query (or multiple queries in parallel) to gather data regarding each query's underlying intent (what is the purpose behind each query, what data is being searched for, and/or the like) and each query's associated attributes. As used herein, the term "attribute," "query attribute," or "attribute of a query" refers to a value, character, letter, and/or the like, that provides information about data, such as a feature, a cell within a record, and/or the like. By way of non-limiting example, the attributes of a query requesting information on a building may comprise a name of a city as one attribute, a city, a zip code, a street address, and/or the like. Such attributes may additionally indicate the location within the data lake the intended information may be found, the type of information searched for, the data values of the information, and any other such information used to complete the instructions of the query. Additionally, and as used herein, the term "intent," "query intent," or "intent of a query" may refer to the underlying objective or purpose behind the query. In some embodiments, and based on the attributes collected as the query runs, the system may determine the intent of the query based on the attributes collected (e.g., if query is requesting information on a building, then an intent or purpose behind the query may be identified as a searching for the location of the building).

In some embodiments, the intent may be derived based on a combination of the attributes collected. In some embodiments, the intent may be derived before the attributes have been collected, and based on the query identified. Additionally, and/or alternatively, the system may use a trained artificial intelligence (AI) engine (or AI bot) to process the query and determine the intent of the query and the associated attributes.

In some embodiments, the query may be parsed by breaking up the query into smaller pieces, where each piece may be analyzed and interpreted to provide the requested results. In some embodiments, the parsing of the query may be done by the trained AI engine (AI bot) to determine the associated intent(s) and attribute(s). Further, and in some embodiments, the parsing of the query may comprise a determination of the different ways to run the query, and determining the best way or most optimal way initially. The process described herein to generate the optimized query may go a step further than this to determine an optimized query among different queries that have already been initially determined as the most optimal path to take to generate the request result.

As shown in block 306, the process flow 300 may include the step of generating a map comprising the at least one query, the at least one intent, and the at least one attribute. For instance, the system may generate a map comprising the at least one identified query, the intent of the query, and the attribute(s) of the query, whereby the map may show an overall view of the query linked with its intent(s) and attribute(s). Thus, and in some embodiments, the map generated by the system may comprise nodes for each query, intent(s), and attribute(s), and edges connected the query to the intent(s) and edges connecting the intent(s) to the attributes(s). Such edges may indicate the relationship between the intent and the query and the intent and the attribute(s) of the query. Additionally, and/or alternatively, the system may generate a map comprising a plurality of queries, intents, and attributes, where some, all, or none of the intents may be shared between the queries, and/or some, all, or none of the attributes may be shared between the queries. In some embodiments, and after generating a map comprising at least the identified query, the intent of the query, and the attribute(s) of the query, the system may apply the map to a cluster of maps of other queries.

Additionally, and in some embodiments, the map described herein may be generated by a graph network designed and configured to analyze the parsed query, cluster any like queries (in an embodiment where multiple queries are mapped in the same map), based on the intents and/or attributes shared between the queries, and generate the map comprising nodes for each piece of data regarding the queries, intents, and attributes, and edges between each node to indicate the relationship between each node.

As shown in block 308, the process flow 300 may include the step of applying the map to a cluster of maps, wherein the cluster of maps comprises the at least one intent associated with at least one secondary attribute different from the at least one attribute, and at least one secondary query. For instance, and as described briefly above, the system may apply the generated map for the at least one query to a cluster of maps comprising other queries, intents, and/or attributes. In some embodiments, the same intent may be mapped to different queries and to shared and unshared attributes (e.g., each intent may be mapped to a plurality of attributes, where one or more may be shared and/or one or more may not be shared). In some embodiments, and upon applying the generated map to the cluster of maps, the system may dynamically update the cluster of maps to reduce any redundant edges between nodes, such that the necessary nodes of intents and attributes are kept for each query (e.g., some duplicate intents and attributes may be deleted and new edges may be created for queries that share their intent(s) and attributes with already present nodes within the cluster map).

Thus, and as described herein, the term "secondary attribute" is meant to clarify that different attributes from the previously determined or identified attributes of the query described hereinabove may be identified in the cluster of maps. In some embodiments, the cluster of maps may comprise a plurality of intents, queries, and attributes which same some of the same intents and/or attributes with the originally identified query (of block 302), and/or may not share some of the same intents and/or attributes. Similarly, and as a person of skill in the art would understand, the term "secondary query" is meant in a similar exemplary manner as "secondary attribute" as that described hereinabove and is not intended to be limiting.

In some embodiments, and in the cluster of maps, the previously generated map may be grouped with like queries, which may share intents or attributes. In this manner, and by grouping like queries together within the cluster map, the system may identify frequency of redundant queries, intents, and attributes.

As shown in block 310, the process flow 300 may include the step of generating, based on the cluster of maps, a heat map of the cluster of maps, wherein the heat map comprises an indication of a computer processing consumption of at least one query with the at least one intent and the at least one attribute, and the at least one secondary intent with the at least one secondary attribute and the at least one secondary query. For example, and in some embodiments, the system may generate—based on the updated cluster of maps with the previously generated map—a heat map which indicates the computer processing consumption of each query (and in some embodiments, the computer components used or interacted with for each query) and/or intent. In some embodiments, such a heat map may indicate which computing components are being used too much for their capability (e.g., based on power consumption, memory availability, processing speed, and/or the like). Additionally, and/or alternatively, the heat map may indicate which queries, with which intent and with which attribute(s), are the best for computer processing consumption (e.g., based on the individual or the combination of computing components, and their power consumption, memory availability, processing speed, and/or the like). In some embodiments, the computer processing consumption may be indicated as a rate (e.g., a value, such as a percentage or whole numerical number), a color indicator or highlighting (e.g., red indicates too high of computer processing consumption, green indicates low computer processing consumption, yellow indicates a middle level computer processing consumption), and/or the like. Additionally, and as used herein, the computer processing consumption may comprise a memory resource consumption, a power resource consumption, and/or a processing component consumption.

Additionally, and in some embodiments, the system may use a AI engine—like the one described hereinabove—to generate the heat map. In some embodiments, the AI engine may be pre-trained on historical queries, intents, attributes, and historical computer processing when the historical queries are run. Thus, and based on this training, the AI engine may accurately determine the computer processing consumption for each query based on the overall data of the query, the intent, and attributes. Additionally, and/or alternatively, the AI engine may also accurately determine the computer processing consumption based on the query and/or attributes, alone.

As shown in block 312, the process flow 300 may include the step of determining, based on the heat map, an optimized query for the at least one intent. For example, the system may determine—based on the heat map—an optimized query for an intent, whereby the system may look at the heat map for each intent, determine the least computer processing consumption used for each intent, identify—based on the query with the least computer processing consumption— which query is best for each intent. Thus, and in some embodiments, the system may analyze all the queries for each intent, generate an identifier for each intent (which may be shared for multiple queries when the purpose is the same), and determine based on the shared intent identifier, the query with lowest computer processing consumption.

FIG. 4 illustrates a process flow 400 for updating the heat map using an AI engine, in accordance with an embodiment of the disclosure. In some embodiments, a system (e.g., similar to one or more of the systems described herein with respect to FIGS. 1A-1C) may perform one or more of the steps of process flow 400. For example, a system (e.g., the system 130 described herein with respect to FIG. 1A-1C) may perform the steps of process 400. In some embodiments, an artificial intelligence engine (e.g., such as the AI engine shown in FIG. 2) may perform some or all of the steps described in process flow 400.

In some embodiments, and as shown in block 402, the process flow 400 may include the step of updating, by an artificial intelligence (AI) engine, the heat map, wherein the AI engine monitors the computer processing consumption of each query in the heat map. For example, and in some such embodiments, the system may regularly or continuously update the heat map, whereby the AI engine may monitor each computer processing consumption for each query in the map continuously. In some embodiments, the AI engine may only update the heat map to indicate major changes within the computer processing consumption for each query, such as when the computer processing consumption changes to indicate a too high of power being used as compared to the previous version of the heat map showing a middle level or a low level of power being consumed. In some embodiments, the change in color indicators or percentages above a pre-defined threshold may be required before the heat map is updated by the AI engine.

In some embodiments, the AI engine may regularly, and pre-defined intervals update the heat map to show the latest computer processing consumption of each query. In some such embodiments, the pre-defined interval may be input by a client of the system, by a client managing the data lake associated with the query of the heat map, by a manager of the system, by the system itself (based on historical intervals), and/or the like. Additionally, and in some embodiments, the process described herein may occur after and/or in response to the process described herein for block 310.

FIG. 5 illustrates a process flow 500 for determining an optimized query from an intent table, in accordance with an embodiment of the disclosure. In some embodiments, a system (e.g., similar to one or more of the systems described herein with respect to FIGS. 1A-1C) may perform one or more of the steps of process flow 500. For example, a system (e.g., the system 130 described herein with respect to FIG. 1A-1C) may perform the steps of process 500. In some embodiments, an artificial intelligence engine (e.g., such as the AI engine shown in FIG. 2) may perform some or all of the steps described in process flow 500.

In some embodiments, and as shown in block 502, the process flow 500 may include the step of generating, based on the heat map, an intent table comprising a plurality of optimized queries with associated optimized attributes and associated optimized queries. For instance, and in some such embodiments, the system may generate—based on the heat map originally generated and/or updated (like that shown in FIG. 4)—an intent table comprising a plurality of optimized queries, whereby the intent table may organize the optimized queries with their optimized intent and optimized queries. Thus, and in some such embodiments, each row may be configured to show an optimized query for each intent (an associated optimized intent), associated intent for each optimized query, and associated attributes for the optimized query.

In some embodiments, and as shown in block 504, the process flow 500 may include the step of identifying at least one new query. Additionally, and in some such embodiments, the system may identify a new query which may not have been previously identified before, parsed before, and/or the like, by the system. Such a new intent may be identified by the system in the same or similar manner to the identification of the original query described above with respect to FIG. 3. Additionally, and in some embodiments, such a new query may be generated and received/identified by the system in any of the same or similar manners as those described above with respect to FIG. 3.

Additionally, and in some embodiments, the new query may not match any previously identified queries of the system, thus, making the new query new overall to the system. Thus, and in such embodiments, the system may be configured to determine whether an optimized query previously generated may be used in place of the new query.

In some embodiments, and as shown in block 506, the process flow 500 may include the step of parsing the at least one new query and determining a new intent associated with the at least one new query. For example, and in some such embodiments, the system may parse the new query in the same or similar manner as that described above with respect to the parsing of the at least one query in FIG. 3. Further, and based on this parsing, data regarding the new query may be determined, such as but not limited the intent of the query, the attribute(s) of the query, and/or the like. In some such embodiments, and based on parsing the new intent, the system may determine a new intent, which may match previously identified intents in the intent table and/or may not match any of the previously identified intents in the intent table.

In some embodiments, and as shown in block 508, the process flow 500 may include the step of determining, from the intent table, an optimized query for the at least one new query based on an optimized intent of the optimized query matching the at least one new intent. For instance, and in some such embodiments, the system may determine—using the intent table and the optimized intents of each optimized query in the intent table—whether any of the optimized intents match or are similar to the new intent determined by the system. In this manner, and where an optimized intent matches the new intent, the system may identify the associated optimized query of the matched optimized intent to be used in place of the new query. In some embodiments, the system may determine none the optimized intents in the intent table match the new intent, and instead may use a similar optimized intent to the new intent. Such a similar optimized intent may be determined based on a similarity in the attributes of the new query compared with the optimized attributes of each optimized query, whereby a similarity threshold may be used to determine the new intent is similar to an optimized intent. By way of none-limiting example, and where the optimized attributes comprises 5 attributes, and 4 attributes of the new query match the optimized attributes, then the similarity percentage between the optimized query and the new query may be 80% and where the pre-defined similarity threshold is 75%, then the system may determine the optimized query may be used in place of the new query.

In some embodiments, and based on identifying the optimized query for the new query, the system may generate a query suggestion interface component which comprises the details of the optimized query in a computer-readable format, and may transmit the query suggestion interface component to a user device associated with the new query. In this manner, and upon transmitting the query suggestion interface component, the system may trigger a configuration of the graphical user interface of the user device to show the details of the optimized query and allow the user to determine whether to use the optimized query in place of the new query. In some embodiments, such details shown to the user may comprise the optimized intent, the optimized attributes, the computer processing consumption, and/or the like.

FIG. 6 illustrates a process flow 600 for generating the heat map with the cluster of maps, in accordance with an embodiment of the disclosure. In some embodiments, a system (e.g., similar to one or more of the systems described herein with respect to FIGS. 1A-1C) may perform one or more of the steps of process flow 600. For example, a system (e.g., the system 130 described herein with respect to FIG. 1A-1C) may perform the steps of process 600. In some embodiments, an artificial intelligence engine (e.g., such as the AI engine shown in FIG. 2) may perform some or all of the steps described in process flow 600.

In some embodiments, and as shown in block 602, the process flow 600 may include the step of generating the heat map comprising the cluster of maps, wherein the heat map further comprises the at least one different query with the at least one different intent and the at least one different attribute. For instance, and in some embodiments, the system may generate the heat map comprising the cluster of maps to show different queries that have been identified by the system, their associated intents, and associated attributes. As used herein, such a heat map may comprise many different queries that have all been identified by the system, different and/or shared intents, different and/or shared attributes, and/or the like. Thus, and as used herein, the heat map may comprise a broad and total view of all the queries, their intents, attributes, and computer processing consumption and/or computer components used in running each query, which in turn gives an overview of each query such that an optimized query may be identified for each intent.

Such a process described herein may occur after and/or in response to the process described herein for block 308 (as an additional and/or alternative step to block 310).

FIG. 7 illustrates a process flow 700 for determining a frequency of the at least one intent in the cluster of maps, in accordance with an embodiment of the disclosure. In some embodiments, a system (e.g., similar to one or more of the systems described herein with respect to FIGS. 1A-1C) may perform one or more of the steps of process flow 700. For example, a system (e.g., the system 130 described herein with respect to FIG. 1A-1C) may perform the steps of process 700. In some embodiments, an artificial intelligence engine (e.g., such as the AI engine shown in FIG. 2) may perform some or all of the steps described in process flow 700.

In some embodiments, and as shown in block 702, the process flow 700 may include the step of determining, based on the application of the map to the cluster of maps, a frequency of the at least one intent in the cluster of maps, wherein the frequency of the at least one intent is based on a presence of the at least one intent in the cluster of maps. For example, and in some such embodiments, the system may determine, based on applying the generated map to the cluster of maps—a frequency of each intent within the cluster of maps. For instance, the frequency described herein may indicate the number of times each intent (e.g., intent identifier) is present across each query and/or across each attribute. In this manner, and the greater the frequency (the greater the number of times an intent is linked by an edge to a query and/or an attribute compared to the overall number of intents), the system may cache the most frequently used intents and their group attributes to a short term memory for quick and efficient recall for the data lake, database, application, and/or the like. Further embodiments based on this frequency of intents is described in further detail hereinbelow with respect to FIG. 8. Additionally, and in some embodiments, such a process described herein may occur after and/or in response to the process described herein for block 308 (as an additional and/or alternative step to block 310).

FIG. 8 illustrates a process flow 800 for generating a cache of highest frequency of intents, in accordance with an embodiment of the disclosure. In some embodiments, a system (e.g., similar to one or more of the systems described herein with respect to FIGS. 1A-1C) may perform one or more of the steps of process flow 800. For example, a system (e.g., the system 130 described herein with respect to FIG. 1A-1C) may perform the steps of process 800. In some embodiments, an artificial intelligence engine (e.g., such as the AI engine shown in FIG. 2) may perform some or all of the steps described in process flow 800.

In some embodiments, and as shown in block 802, the process flow 800 may include the step of determining, based on the application of the map to the cluster of maps, a highest frequency of intents in the cluster of maps, wherein the highest frequency of intents is based on a highest presence between the at least one intent and the at least one secondary intent. For example, and in some such embodiments, the system may determine which intents have the highest level of frequency within the cluster of maps based on identifying the total number of intents and determining which intent identifiers were linked with the greatest number of queries and/or attributes (i.e., have the highest presence between the different intents, such as the original intent, the second intent, the new intent, the different intent(s), and/or the like). Based on this highest frequency, the system may system may generate a short term cache of the intents, and their associated queries (and/or the associated optimized query for the highest frequency intent(s)), such that the intents and their query(ies) may be stored for future, quicker recall.

In some embodiments, and as shown in block 804, the process flow 800 may include the step of generating, based on the highest frequency of intents, a cache of the highest frequency of intents, wherein the cache comprises at least one intent and the at least one attribute or the at least one secondary intent and the at least one secondary attribute. For example, and in some such embodiments, the cache of the highest frequency of intents may be comprise a short-term or temporary storage of the most frequently-used intents, and in some embodiments, the optimized query(ies) associated with the highest frequency intent(s), such that the optimized query(ies) are ready to be used quickly, easily, and efficiently, with as little computer processing consumption as possible.

FIG. 9 illustrates an exemplary technical flow diagram 900 for generating a cluster of maps and caching intents, in accordance with an embodiment of the disclosure. In some embodiments, a system (e.g., similar to one or more of the systems described herein with respect to FIGS. 1A-1C) may perform one or more of the steps of diagram 900. For example, a system (e.g., the system 130 described herein with respect to FIG. 1A-1C) may perform the steps of diagram 900. In some embodiments, an artificial intelligence engine (e.g., such as the AI engine shown in FIG. 2) may perform some or all of the steps described in diagram 900.

For instance, and as shown in diagram 900, an application sitting on top of a database, a data lake, and/or the like, (such as an "SDP Bronze Layer" like that shown herein) may be tasked with receiving and/or generating queries to interact with and gather data from the data lake, database, and/or the like. Based on the queries transmitted from these applications, the system may be configured to parse each query, generate a map of the queries and their associated data (attributes and intents), generate a cluster of maps based on the maps for each query (and/or plurality of queries), and transmit the cluster of maps for further processing to determine the optimized query for each intent. Further, and as shown in diagram 900, the cluster of maps may be cached after to determining which intents from the cluster of maps are of the highest frequency, and such a cache may comprise the intents and at least their attributes. In some embodiments, the cache may additionally comprise the queries of each highest frequency intent(s).

FIG. 10 illustrates an exemplary technical flow diagram 1000 for generating optimized queries for disparate data sources, in accordance with an embodiment of the disclosure. In some embodiments, a system (e.g., similar to one or more of the systems described herein with respect to FIGS. 1A-1C) may perform one or more of the steps of diagram 1000. For example, a system (e.g., the system 130 described herein with respect to FIG. 1A-1C) may perform the steps of diagram 900. In some embodiments, an artificial intelligence engine (e.g., such as the AI engine shown in FIG. 2) may perform some or all of the steps described in diagram 1000.

As shown in diagram 1000, the system may be configured with an AI engine (and/or a generative AI bot) which may use the data of each query to generate a cluster of maps comprising the different identified queries, their attributes, and their intents, similar to the cluster of maps in 1001, which comprises various nodes for the queries, intents, and attributes, and the edges between each node. Additionally, and as shown in diagram 1000, a heat map 1002 may be generated from the cluster of maps, which may show the computer processing consumption and/or the computer components used in running each query. Further, and based on the generated heat map, the system may determine the optimized queries for each intent and generate an intent table like that shown as "global intent table" 1103, which may be used for identifying optimized queries for each intent in the future.

In some embodiments, and based on the intent table, the system may train and configure a generative AI engine or bot to generate new optimized queries to be used in place of any future new queries that have not preivosly been identified or optimized by the system. In this manner, the system may use the optimized intents and optimized attributes of the intent table to train the generative AI engine to generate the new optimized query for any new and unknown queries introduced to the system.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for generating optimized queries for disparate data sources, the system comprising:

a memory device with computer-readable program code stored thereon;

at least one processing device operatively coupled to the at least one memory device and at least one communication device, wherein executing the computer-readable code is configured to cause the at least one processing device to:

identify at least one query for at least one data source;

determine, based on a parsing of the at least one query, at least one attribute and at least one intent of the at least one query;

generate a map comprising the at least one query, the at least one intent, and the at least one attribute;

apply the map to a cluster of maps, wherein the cluster of maps comprises the at least one intent associated with at least one secondary attribute different from the at least one attribute, and at least one secondary query;

generate, based on the cluster of maps, a heat map of the cluster of maps, wherein the heat map comprises an indication of a computer processing consumption of the at least one query with the at least one intent and the at least one attribute, and the at least one secondary intent with the at least one secondary attribute and the at least one secondary query;

determine, based on the heat map, an optimized query for the at least one intent, wherein the optimized query is determined based on the at least one intent comprising an edge related to the optimized query in the heat map, and wherein the optimzied query in the heat map comprises an indication of a lesser computer processing consumption compared to the indication of the computer processing consumption of the at least one query; and run, in response to determining the optimzied query, the optimized query at the at least one data source.

2. The system of claim 1, wherein executing the computer-readable code is further configured to cause the at least one processing device to:

update, by an artificial intelligence (AI) engine, the heat map, wherein the AI engine monitors the computer processing consumption of each query in the heat map.

3. The system of claim 1, wherein executing the computer-readable code is further configured to cause the at least one processing device to:

generate, based on the heat map, an intent table comprising a plurality of optimized queries with associated optimized attributes and associated optimized intents;

identify at least one new query;

parse the at least one new query and determine a new intent associated with the at least one new query; and determine, from the intent table, an optimized query for the at least one new query based on matching the new intent to an optimized intent of the optimized query.

4. The system of claim 3, wherein the optimized query comprises a lesser computer processing consumption rate than the new query.

5. The system of claim 1, wherein the determination of the optimized query is based on an optimized computer processing consumption in the heat map, wherein the optimized computer processing consumption is based on a lowest computer processing consumption rate.

6. The system of claim 1, wherein the cluster of maps further comprises at least one different query, at least one different intent, and at least one different attribute, and wherein executing the computer-readable code is further configured to cause the at least one processing device to:

generate the heat map comprising the cluster of maps, wherein the heat map further comprises the at least one different query with the at least one different intent and the at least one different attribute.

7. The system of claim 1, wherein the computer processing consumption comprises a memory resource consumption, a power resource consumption, or a processing component consumption.

8. The system of claim 1, wherein the at least one intent comprises the at least one attribute for the at least one query.

9. The system of claim 1, wherein executing the computer-readable code is further configured to cause the at least one processing device to:

determine, based on the application of the map to the cluster of maps, a frequency of the at least one intent in the cluster of maps, wherein the frequency of the at least one intent is based on a presence of the at least one intent in the cluster of maps.

10. The system of claim 1, wherein executing the computer-readable code is further configured to cause the at least one processing device to:

determine, based on the application of the map to the cluster of maps, a highest frequency of intents in the cluster of maps, wherein the highest frequency of intents is based on a highest presence between the at least one intent and the at least one secondary intent; and generate, based on the highest frequency of intents, a cache of the highest frequency of intents, wherein the cache comprises at least one intent and the at least one attribute or the at least one secondary intent and the at least one secondary attribute.

11. A computer program product for generating optimized queries for disparate data sources, the computer program product comprising a non-transitory computer-readable medium comprising code causing an apparatus to:

identify at least one query;

determine, based on a parsing of the at least one query, at least one attribute and at least one intent of the at least one query;

generate a map comprising the at least one query, the at least one intent, and the at least one attribute;

apply the map to a cluster of maps, wherein the cluster of maps comprises the at least one intent associated with at least one secondary attribute different from the at least one attribute, and at least one secondary query;

generate, based on the cluster of maps, a heat map of the cluster of maps, wherein the heat map comprises an indication of a computer processing consumption of the at least one query with the at least one intent and the at least one attribute, and the at least one secondary intent with the at least one secondary attribute and the at least one secondary query;

determine, based on the heat map, an optimized query for the at least one intent, wherein the optimized query is determined based on the at least one intent comprising an edge related to the optimized query in the heat map, and wherein the optimzied query in the heat map comprises an indication of a lesser computer processing consumption compared to the indication of the computer processing consumption of the at least one query; and run, in response to determining the optimzied query, the optimized query at the at least one data source.

12. The computer program product of claim 11, wherein the computer program product further comprises non-transitory computer-readable medium comprising code causing the apparatus to:

update, by an artificial intelligence (AI) engine, the heat map, wherein the AI engine monitors the computer processing consumption of each query in the heat map.

13. The computer program product of claim 11, wherein the computer program product further comprises non-transitory computer-readable medium comprising code causing the apparatus to:

generate, based on the heat map, an intent table comprising a plurality of optimized queries with associated optimized attributes and associated optimized intents;

identify at least one new query;

parse the at least one new query and determine a new intent associated with the at least one new query; and determine, from the intent table, an optimized query for the at least one new query based on matching the new intent to an optimized intent of the optimized query.

14. The computer program product of claim 11, wherein the determination of the optimized query is based on an optimized computer processing consumption in the heat map, wherein the optimized consumption processing component is based on a lowest consumption processing component rate.

15. The computer program product of claim 11, wherein the computer program product further comprises non-transitory computer-readable medium comprising code causing the apparatus to:

determine, based on the application of the map to the cluster of maps, a frequency of the at least one intent in the cluster of maps, wherein the frequency of the at least one intent is based on a presence of the at least one intent in the cluster of maps.

16. A computer implemented method for generating optimized queries for disparate data sources, the computer implemented method comprising:

identifying at least one query;

determining, based on a parsing of the at least one query, at least one attribute and at least one intent of the at least one query;

generating a map comprising the at least one query, the at least one intent, and the at least one attribute;

applying the map to a cluster of maps, wherein the cluster of maps comprises the at least one intent associated with at least one secondary attribute different from the at least one attribute, and at least one secondary query;

generating, based on the cluster of maps, a heat map of the cluster of maps, wherein the heat map comprises an indication of a computer processing consumption of the at least one query with the at least one intent and the at least one attribute, and the at least one secondary intent with the at least one secondary attribute and the at least one secondary query;

determining, based on the heat map, an optimized query for the at least one intent, wherein the optimized query is determined based on the at least one intent comprising an edge related to the optimized query in the heat map, and wherein the optimzied query in the heat map comprises an indication of a lesser computer processing consumption compared to the indication of the computer processing consumption of the at least one query; and run, in response to determining the optimzied query, the optimized query at the at least one data source.

17. The computer implemented method of claim 16, further comprising updating, by an artificial intelligence (AI) engine, the heat map, wherein the AI engine monitors the computer processing consumption of each query in the heat map.

18. The computer implemented method of claim 16, further comprising:

generating, based on the heat map, an intent table comprising a plurality of optimized queries with associated optimized attributes and associated optimized intents;

identifying at least one new query;

parsing the at least one new query and determine a new intent associated with the at least one new query; and determining, from the intent table, an optimized query for the at least one new query based on matching the new intent to an optimized intent of the optimized query.

19. The computer implemented method of claim 16, wherein the determination of the optimized query is based on an optimized computer processing consumption in the heat map, wherein the optimized consumption processing component is based on a lowest computer processing consumption rate.

20. The computer implemented method of claim 16, further comprising:

determining, based on the application of the map to the cluster of maps, a frequency of the at least one intent in the cluster of maps, wherein the frequency of the at least one intent is based on a presence of the at least one intent in the cluster of maps.

* * * * *